United States Patent [19]
Motsch et al.

[11] Patent Number: 4,614,972
[45] Date of Patent: Sep. 30, 1986

[54] TELETEXT RECEIVER

[75] Inventors: Roger Motsch, Mordelles; Claude Séchet, Rennes, both of France

[73] Assignee: L'Etat Français, France

[21] Appl. No.: 580,535

[22] Filed: Feb. 15, 1984

[30] Foreign Application Priority Data

Feb. 22, 1983 [FR] France ............................... 83 02860

[51] Int. Cl.⁴ ........................ H04N 7/087; H04N 7/04
[52] U.S. Cl. ..................................... 358/147; 358/142
[58] Field of Search ........................ 358/142, 146, 147

[56] References Cited

U.S. PATENT DOCUMENTS

| | | | |
|---|---|---|---|
| 4,290,062 | 2/1979 | Marti et al. ........................ | 340/721 |
| 4,308,558 | 12/1981 | Hernandez et al. ................. | 358/146 |
| 4,361,848 | 11/1982 | Poignet et al. ..................... | 358/146 |
| 4,388,645 | 6/1983 | Cox et al. ........................... | 358/142 |

FOREIGN PATENT DOCUMENTS

82/03290  9/1982  PCT Int'l Appl. ................. 358/147

OTHER PUBLICATIONS

IEEE Transactions on Consumer Electronics, "Antiope and D.R.C.S.", vol. CE-26, No. 3, 1980, U.S., O. Lambert et al., pp. 600–604.

IEEE Transactions on Consumer Electronics, "Adaption of U.K. Teletext System for 525/60 Operation", G. O. Crowther, vol. CE-26, No. 3, 1980, New York, U.S., pp. 587–599.

IEEE Transactions on Consumer Electronics, "Enhanced U.K. Teletext Moves Towards Still Pictures", J. P. Chambers, et al, vol. CE-26, No. 3, 1980, New York, U.S., pp. 527–554.

Primary Examiner—James J. Groody
Assistant Examiner—Michael D. Parker
Attorney, Agent, or Firm—Handal & Morofsky

[57] ABSTRACT

A teletext receiver incorporating a demodulation circuit, a data demultiplexing circuit, a memory, a microprocessor and a numbering keyboard. The inventive receiver also comprises an early article acquisition decision circuit disposed between the demultiplexing circuit and the memory. This circuit incorporates a shift register with five cells, a storage module having a first group of three storage cells able to store three bytes, a second group of three storage cells able to store three bytes, a two-bit flip-flop, a logic comparison circuit incorporating a first group of three byte comparators, a second group of three byte comparators, an article start code detector, and a comparison synthesis logic circuit connected to the six byte comparators, to the detector and to the flip-flop. This circuit supplies an opening or closing control signal applied to the control input of the memory. The microprocessor loads in an appropriate manner the storage cells with bytes defining a page to be selected and bytes defining a threshold, such that all the articles whose classification bytes exceed this threshold, bring about the appearance of the memory opening signal. The microprocessor checks after each data transmission cycle the state of the memory in order to raise or lower the threshold, or leave it unchanged.

1 Claim, 3 Drawing Figures

TELETEXT RECEIVER

BACKGROUND OF THE INVENTION

The present invention relates to a teletext receiver, equipped with means permitting an early acquisition of certain transmitted articles.

In order to avoid any confusion regarding the terminology to be used hereinafter, it is firstly pointed out that the expression videography designates a telecommunications process making it possible to provide a user with alphanumeric or graphic messages on a display screen. In a variant of this process, the messages are systematically transmitted by a television network and the user can make a choice between these messages. It then constituted so-called transmitted videography, which is also called teletext and in France, the "ANTIOPE" system is in accordance with this variant.

In a teletext system, the information is coded in digital form and it is organised in accordance with the French DIDON standard (for digital data transmission). This standard is described in numerous documents, particularly in No. 3.80 and 1.82 of the Journal "Radiodiffusion-Télévision", in French Pat. No. 2,313,825 published on June 6, 1975, in its first certificate of addition 2,393,480, published on Mar. 6, 1977 and in French Pat. No. 2,404,350, published on Sept. 26, 1977.

In connection with this standard, it is merely pointed out that the digital data are organised into bytes grouped in a block. A heading, which is also formed from bytes, is added to each block and the combination constitutes a packet. For use in France in accordance with the so-called L standard, the maximum size of a packet is 40 bytes. Such a packet is inserted in a line of the image, either solely in that part of the image reserved for the vertical scanning return and partly occupied by the frame sync signals and possibly other control signals, the remainder of the image being occupied by conventional video signals, or over the complete image in the absence of any video signal. On reception, the packets are sorted by demultiplexing and, by heading processing, the data blocks are restored.

In the ANTIOPE system, separate messages can be multiplexed within the same digital channel by means of structuring in the form of "articles". The structure of the articles makes it possible to multiplex together, either the screen description messages, or other types of information.

Each article is constituted by four consecutive sequences: an article start, an article heading, a data field and an article end. Such a structure is shown in FIG. 1.

The article start and end are designated by special codes. In general terms, it is known that the codes used in teletext are arranged in a table having 16 rows and 8 columns, each code being designated by the rank or order of its column (expressed from 0 to 7) and the rank or order of its row (expressed from 0 to 15). Thus, for the article start use is made of two SOH codes of ranks 0/1 and RS of ranks 1/14. The article end is coded by ETX-EOT of respective ranks 0/3 and 0/4.

The article heading is constituted by a sequence of bytes, which have undergone Hamming coding (i.e. per byte: 4 information bits and 4 protection bits). It consists of the 3 following successive parts: a classification sequence, a connecting byte and an interpretation sequence.

The classification sequence makes it possible to transmit a "classification number" designating the message in the file of messages to be transmitted and participates in the linking of the source and receiver. For example, it consists of the selection of a "page" by its "number". This sequence has three bytes C1, C2, C3 (indicated in their transmission order).

Each byte has a value, which can be hexadecimally notated. The 16 possible values are designated 0 to 9 for the first 10 values and A, B, C, D, E, F for the 6 last values. The values assumed by these bytes define a first classification of the nature of the messages carried by the article.

The different articles are distributed into three classes, in accordance with their classsification number.
   First class: C1=C2=C3=0: this article number is reserved for the description of the "rows 0", row 0 being "an auxiliary screen" intended for the display of service messages. In teletext, a reception terminal is supposed to acquire and interpret all the articles of number 0 (the interpretation of a given article corresponding to an explicit request from the user having a priority, i.e. it hides the acquisition of the rows 0 during processing.)
   Second Class: C1C2C3 between 001 and 999. This numbering field is reserved for the transmission of information relating to a particular displayable message relating to the main screen (rows 1 to 24 and margins). In this case, C1, C2 and C3 respectively represent hundreds, tens and units of the page number.
   Third class: At least one the bytes C1, C2, C3 is equal to A, the others being between 0 and 9. The value A must be considered as equivalent to any random value taken by the corresponding byte between 0 and 9. However, the number 000 must not be considered as included in this equivalence. This mechanism makes it possible to address a single message in a simultaneous manner relative to several terminals connected to "numbers" of different pages.

All these questions are described in detail in 3.80 and 1.82 of the Journal "Radiodiffusion-télévision".

Having recalled these various characteristics of a teletext system, reference will now be made to the problem to be solved by the invention.

A magazine intended for a teletext system is distributed or transmitted in a cyclic manner. The articles forming this magazine (whose structure has been defined) are also cyclically transmitted. On reception, the user selects an article by typing on a keyboard a number having three digits between 001 and 999. On the basis of what has been stated hereinbefore, it is clear that the user only has access to the articles of the second class, the number displayed on the keyboard coinciding with the number of a page in the magazine.

In the first teletext systems, the information necessary for the display of a page was entirely contained in the corresponding article. The choice of a single page from among the cyclically transmitted pages was brought about by appropriate software making it possible to compare the codes C1, C2, C3 of the articles received with the three digits selected by the user by means of this keyboard.

However, nowadays the systems are much more complex and the information corresponding to a page to be displayed can no longer be included within a single article.

Thus, different articles or units have been made to appear, such as e.g.:

so-called service pages which must be systematically acquired and therein is generally found information relating to the selected article (title, magazine number, etc) indicating the origin of the magazine (distribution chain, data bank name, etc);

so-called "telecharging" or "teleloading" units which are used for transmitting information common to several user pages, said units being possibly alphabets, colour ranges, page bottom information;

message units, which can be information used by the terminal for controlling the starting up of equipment such as magnetoscopes and can also be summary-type information on the transmitted or distributed magazines;

optionally instructions intended for the terminal (e.g. an instruction to display a subtitle);

entry in session units which contain information defining the link between the articles, e.g. one unit will contain the list of articles in the magazine and for each article the associated telecharging page numbers.

Each of these articles is given its own number. Thus, a teletext receiver must take into account several articles for a single requested page.

The tests to be carried out may consequently take a considerable time, so that at the transmission source it is necessary to bring about a greater spacing between the articles, so that the receiver can check the headings of all the magazine articles. It is therefore necessary to use the transmission channel in a non-optimum manner.

SUMMARY OF THE INVENTION

The object of the present invention is to obviate this disadvantage by giving the teletext receivers means making it possible to simplify the tests, particularly by shortening the processing time and by minimizing the number of logic operations required.

Thus, according to the invention, in the receiver is used, apart from the known members making it possible to acquire a desired page, means making it possible to acquire beforehand complementary articles making it possible for the user to restore a selected page.

These means essentially consists of a circuit, called the acquisition decision circuit or CDA, which cooperates with the conventional receiver means, namely the informatics means able to manage the receiver members and the receiver memory, which receives the different articles necessary for restoring the chosen image. This circuit essentially comprises means making it possible to carry out comparison tests on the bytes C1, C2, C3 of the articles received with the bytes A1, A2, A3 designating the page selected by the user and with bytes B1, B2, B3 constituting a threshold, as from which the acquisition of the articles is decided.

Thus, the invention makes it possible to define a fourth class of articles, which follows the three classes of articles defined hereinbefore and which is as follows:

Fourth class: At least one of the bytes C1, C2, C3 has a value between B and F. It is possible to distinguish the following subclasses. If C1=B: The corresponding values are reserved for articles which are only selected when the decoder is in an appropriate state (television, subtitling, programme identification investigation, etc), other than that in which the user explicitly or implicitly requests a page of the first category (0 to 999);

if C1 assumes any random one of the values C, D, E, F, the different codes are classified in the following way:

is C1=F, the article must necessary be examined by a decoder;

if C1≠F, the articles which are of greatest interest receive the highest values, so that E F F designates an article of the highest priority after the "obligatory articles", E F E designates an article coming just after this and so on down to C 0 0.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 1:
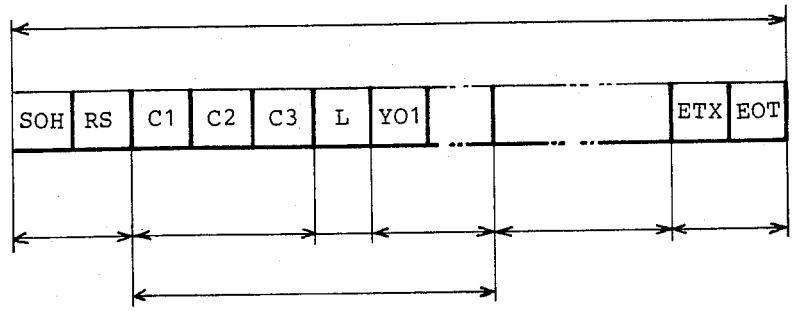
FIG. 1, already described, the structure of an article.
Figure 2:
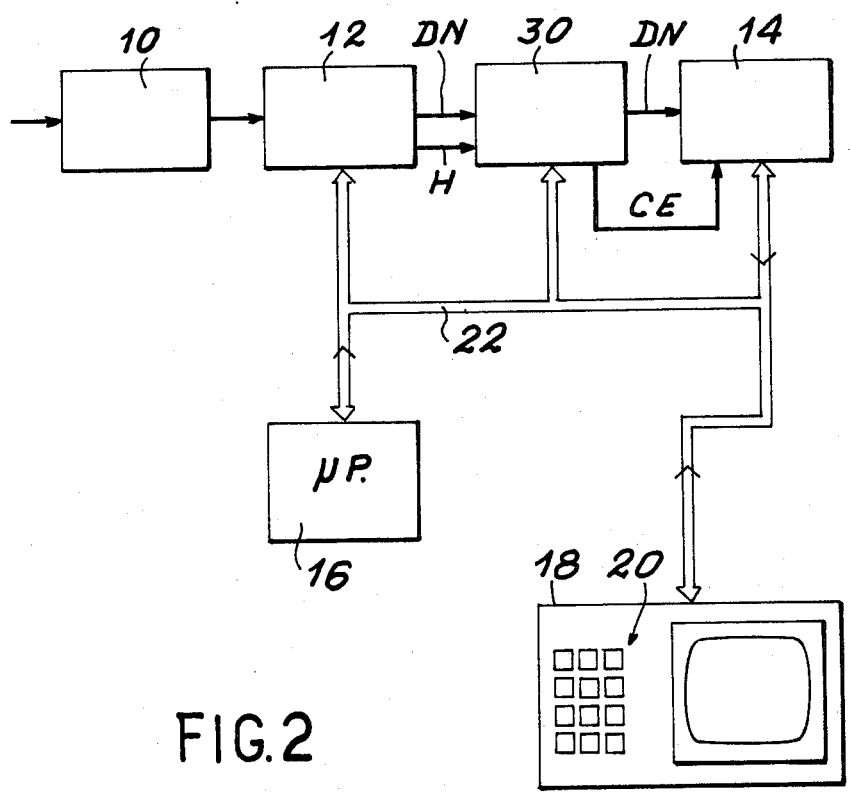
FIG. 2 the positions of the acquisition decision circuit in a teletext receiver according to the invention.

The teletext receiver shown in FIG. 2 firstly comprises in per se known manner a demodulation circuit 10, whose input receives the composite analog-digital signal resulting from the multiplexing of the digital data with the video signal and whose output only supplied digital data. The receiver than comprises a demultiplexing circuit 12, which makes it possible to extract the digital data belonging to each of the channels and to restore the continuity of the channels. This circuit supplies digital data DN organised into articles in the manner illustrated in FIG. 1 and simultaneously a clock signal H accompanying said data. The receiver also comprises a memory 14, which e.g. functions according to the FIFO procedure (first-in-first-out) a microprocessor 16 and various members (television receiver, image memory, etc) collected together into a unit 18, which more particularly incorporates a keyboard 20. Microprocessor 16 is connected to the different members by a bus 22.

The receiver shown in FIG. 2 differs from the prior art by the presence of an acquisition decision circuit 30 or CDA inserted between demultiplexer 12 and memory 14. This circuit receives the digital data DN and the clock signal H and supplies the same data DN to the memory with a signal CE for controlling the opening or closing of the memory. In this way, circuit 30 can control the storage of certain articles, which it considers likely to be used.

The general operating principle of the system is as follows. Bearing in mind the hierarchy prevailing in the different codes of the transmitted articles and which has been defined hereinbefore, the receiver will choose a threshold for the classification codes and as from which the articles will be retained by the CDA and stored in the memory. This threshold is defined by the microprocessor and is displayed in the CDA. It is dependent on the storage capacity of the receiver, which must be able to store all the articles whose number exceeds this threshold, the dynamic management capacity of said memory and the user service operating conditions.

Any article whose classification code exceeds the chosen value will be retained. At the end of a magazine distribution or transmission cycle, the microprocessor tests the content of the memory and establishes either that said memory is still not full, in which case it modifies downwards the threshold value, or that it is just full, in which case the threshold is not modified, or that it has been unable to store all the articles meeting the selection criterion, in which case it will modify the threshold value upwards and will control a new selection cycle.

If the priorities in the codes have been established on transmission, the memory will not only have the article corresponding to the chosen page, but also complementary articles liable to be necessary in the processing of said page.

The operation of this circuit will become more apparent following the description of its structure and an exemplified embodiment.

Figure 3:
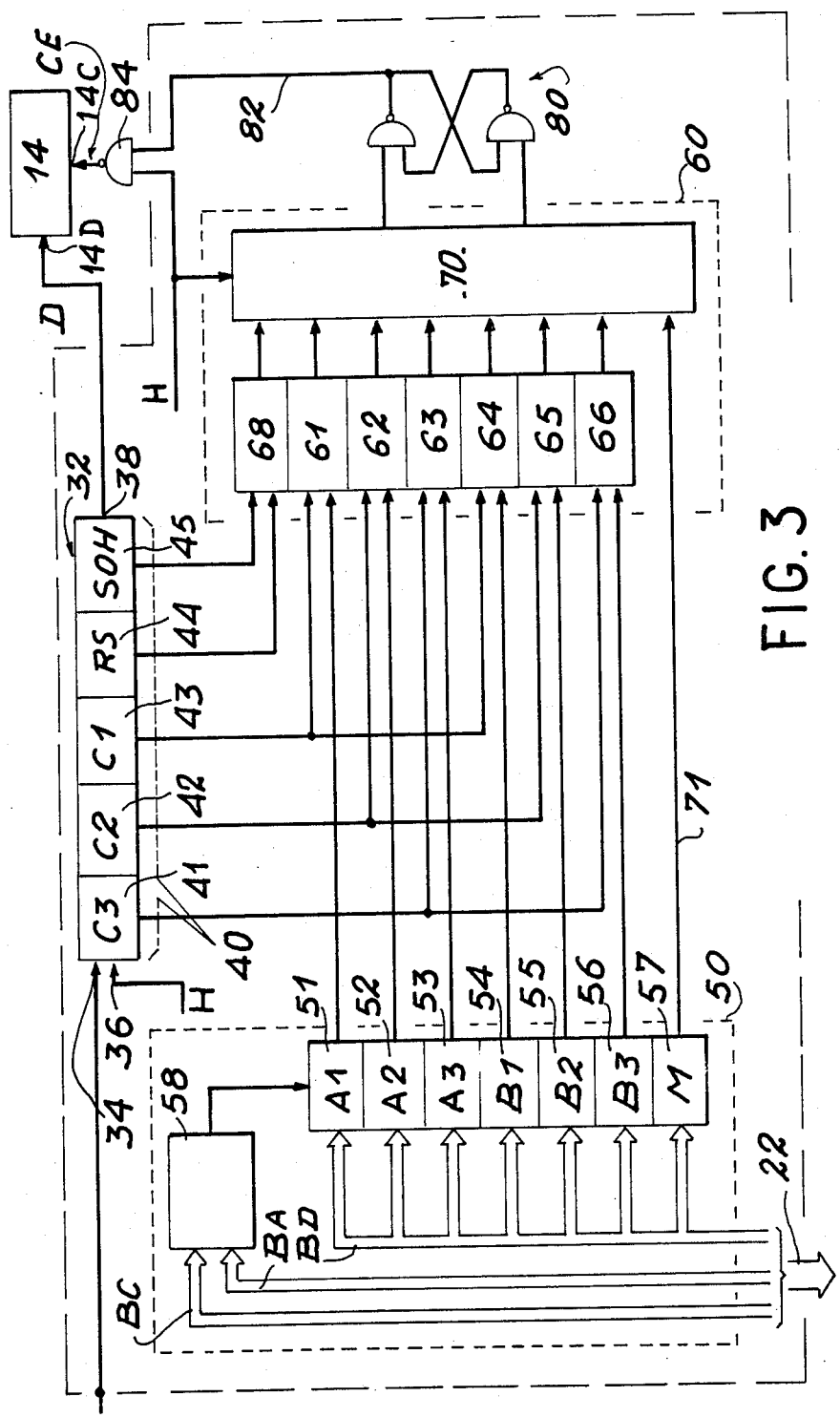
FIG. 3 the structure of this circuit.

The structure of the circuit is shown in FIG. 3 and comprises a shift register 32 having a series input 34, a clock input 36, a series output 38 and five parallel outputs 40, said register containing five cells 41 to 45. It also comprises a storage module 50 having a first group of three storage cells 51, 52, 53, a second group of three storage cells 54, 55, 56 and a seventh unit or flip-flop 57 having two bits. Each of the cells 51 to 56 can be of the latch flip-flop type, i.e. can be transparent during the complete time when the control clock signal is at 1 and retains the state of the input signal as from the falling front of the clock. For example, it is possible to use circuits of type 74LS273. The module is completed by an address decoding circuit 58, supplied by a control bus BC and an address bus BA. The storage cells are connected to a data bus BD. The three buses form the general bus of the receiver. This circuit also comprises a decision module 60 formed from a first logic circuit incorporating a first group of three byte comparison circuits 61, 62, 63 having two inputs, the first connected to one of the outputs of the cells 51, 52, 53, the second to one of the three first cells 41, 42, 43 of the shift register 32, a second group of three byte comparison circuits 64, 65, 66 with two inputs, the first connected to the output of one of the cells 54, 55, 56, the second to one of the three first cells 41, 42, 43 of the shift register and finally a detector 68 of codes RS and SOH connected to the two cells 44, 45 of the shift register. Circuit 60 also comprises a circuit 70, which carries out the synthesis of the result supplied by all the comparators 61 to 66 and by detector 68. Circuit 70 can be a FPLA circuit (Field Programmable Logic Array), which is a logic network programmable by the user. Circuit 70 supplies two signals, one signal CO controlling the opening of the memory and the other signal CF controlling its closure. The signals are stored in a flip-flop 80, whose output 82 is connected to an input of a NAND gate 84, whereof another input receives the clock pulses H accompanying the data. The output of this gate is applied to the writing control input 14C of memory 14, whose data input 14D also receives the data extracted from shift register 32.

The CDA operates in the following way. The shift register 32 receives the bytes constituting the transmitted articles. Each article starts by SOH and continues by RS and then by the classification bytes C1, C2, C3 (of FIG. 1). As indicated in FIG. 2, these bytes are arranged in the register, byte SOH as a heading in cell 45, byte RS in cell 44 and bytes C1, C2, C3 in cells 43, 42, 41.

Cells 51, 52, 53 of module 50 receive the three bytes A1, A2, A3 forming the page number selected by the user and which is typed on keyboard 20. Cells 54, 55, 56 receive the three bytes B1, B2, B3 defining the acquisition threshold. These two groups of three bytes are supplied by the microprocessor, via data bus BD.

With regards to the two bit flip-flop 57, it can be brought into any one of four states, as a function of the value assumed by the two bits. These four states define the tests to be performed in accordance with the following correspondence:

for 01: it is merely necessary to check whether the article number received (C1, C2, C3) is equal to the number requested by the user (A1, A2, A3);

for 10: it is merely necessary to check whether the article number received (C1, C2, C3) is equal to or greater than the threshold (B1, B2, B3);

for 11: it is necessary to check whether the article number received (C1, C2, C3) is either equal to A1, A2, A3, or is equal to or greater than the threshold (B1, B2, B3);

for 00: resetting takes place.

The nature of the test to be carried out is communicated to circuit FPLA 70 by a connection 71.

The operation of comparators 61 to 66 is obvious and on receiving two bytes, they compare them and indicate whether or not identity exists. Circuit 68 detects the presence of codes SOH and RS, which signifies the arrival of an article. The transmission by the microprocessor of code 00 into flip-flop 57 reinitializes the comparison system and this leads to the closing of the access to memory 14.

For an effective operation, it is therefore necessary that the bits of flip-flop 57 defining the nature of the test must both differ from 0. Under these conditions, the elements of tests A1, A2, A3 and B1, B2, B3 are loaded into memory 51 to 53 and 53 to 56 by the microprocessor. Independently of this loading, all the information received passes through the shift register 32.

Comparators 61 to 66 and detector 68 constitute a combinary logic, so that they operate permanently. Bytes Ai, Bi, Ci (i=1 to 3) are loaded into 50 and 32, when clock H is at low level and when the output of the detector is at 1, which signifies that the codes SOH and RS are received, so that the test is validated.

The opening and closing instructions are stored in flip-flop 80. In order to avoid parasitic openings and closings due to time lags in the different circuits, use is made of the data accompaniment clock H for validating the test results only when the data are stable. The equality between A1, A2, A3 and C1, C2, C3 means that the requested article has been obtained and consequently leads to its transfer into the memory in order to be displayed.

Tests C1, C2, C3 ≧ B1, B2, B3 signify that there is an article which can be useful for the receiver and consequently it is transferred into memory 14 for its subsequent use by the microprocessor if the latter has need thereof, otherwise it is destroyed there.

The validation leads to the application of a memory opening or closing instruction. The opening is obtained when:

the "nature of the test" signal inscribed in 57 is 01, so that we obtain A1=C1, A2=C2 and A3=C3 no matter what B1, B2, B3, the "nature of test" signal is 10, so that we have C1,C2,C3 ≧ B1,B2,B3, i.e.

either C1>B1, or C1=B1 and C2>B2, or C2=B1, C2=B2 and C3≧B3 the "nature of test" signal is 11, so that one or other of the aforementioned conditions is satisfied.

The test being validated, any other condition leads to the closing of the access to the memory. This is also the case when the nature of test signal is 00, independently of the test validation conditions.

An example will now be described to provide a better understanding of the function of the circuit according to the invention.

It will be assumed that the magazine has 10 articles numbered 1 to 10 and directly accessible to the keyboard, these articles contain information on the teleloading page numbers to be acquired prior to the display. There are 3 articles numbered EFD, EFE and EFF (hexadecimal notation), which are teleloading articles used in complementary manner to the 10 aforementioned articles in accordance with the following table, giving for each accessible article (numbered 1 to 10) the complementary articles to be acquired.

|    | EFF | EFE | EFD |
|----|-----|-----|-----|
| 1  | X   | X   |     |
| 2  |     | X   | X   |
| 3  | X   |     |     |
| 4  | X   | X   |     |
| 5  |     | X   |     |
| 6  | X   |     |     |
| 7  | X   |     | X   |
| 8  | X   | X   |     |
| 9  | X   |     |     |
| 10 | X   |     |     |

It should be noted that the source has allocated the highest priority (i.e. EFF, which is higher than the two other codes) to the article most frequently used as a complement to the articles accessible to the keyboard by its number and in the present example, these teleloading articles are complementary alphabets. There is one article F00, which is an entry in session article containing the relationships existing between the displayable articles and the teleloading articles.

There is also a case where the receiver has a small memory only enabling it to store two teleloading articles. It is firstly assumed that the receiver is only able to use the entry in session article F00. When the user requests from the keyboard a page numbered 1 to 10, the acquisition circuit CDA will be programmed in mode 01 to seek the corresponding article. Once the article selected by the CDA has been processed at the memory output, the receiver will check whether the complementary associated pages are present in the memory. In the affirmative, then it will display the page, whilst in the negative it will programme the CDA in mode 10 with a threshold equal to C00 (hexadecimal notation). In this mode, all the teleloading pages will pass into its memory and it will be able to store therein the teleloading articles which it requires, e.g. EFE and EFD selected page is 2 and it will then display the page. This operation requires a supplementary transmission cycle.

When the page is displayed, the receiver reprogrammes the CDA in mode 10 with a threshold equal to EFE, so as to be able to store in its memory the two most frequently used teleloading articles EFF and EFE.

Thus, the receiver is able to display, apart from the magazine transmission cycle, all the pages except those numbered 2 and 7 having need of page EFD. For the latter, it is necessary to have two transmission cycles and the threshold must be lowered to C00.

For a receiver able to use the entry in session page F00, as soon as initialization has taken place, the CDE is programmed in mode 10 with a threshold equal to F00.

In this case, all the articles of form FXX pass through the memory and the receiver more particularly takes account of the article F00.

Use can be made of the example of the user selecting page 2. The receiver already knows through taking account of article F00 that page 2 has need of complementary pages EFE and EFD. Knowing this, as soon as it is selected, it will programme the CDA in mode 11 with A1, A2, A3=002 and B1, B2, B3=EFD. In this way, it has been possible to select all the elements of the page in a single cycle, instead of two cycles as hereinbefore.

If the receiver was not equipped with the CDA circuit according to the invention, operation would involve seeking the requested page on the keyboard and seeking the associated teleloading pages by their numbers. Thus, on the article heading, it is necessary to test whether the number assumes one of several values. When this test is carried out in software, it takes a long time. This is very prejudicial, because at the end of a very short article, there is a risk of not taking account of the heading of the following article.

The receiver can use the content of the entry in session article and store the two most frequently used teleloading articles and seek the article requested on the keyboard, together with the associated teleloading articles not present in its memory.

On comparing the article transmission constraints in both cases, it can be seen that:
- without CDA (prior art): the time between the end of an article heading and the start of the following article heading in the transmission cycle can be such that the receiver is capable of selecting one from among several article numbers and at present this time is 640 µs (i.e. 10 scanning lines);
- with CDA (according to the invention): the constraint now only exists between two consecutive teleloading articles, the time interval between two such articles being usable by displayable articles.

What is claimed is:

1. A teletext receiver comprising:
a demodulation circuit having an input receiving a composite signal resulting from multiplexing between digital data and a video signal and an output supplying the digital data only,
a data demultiplexing circuit having an input connected to the output of the demodulation circuit and an output supplying digital data along continuous channels, said data being organized into articles, each article incorporating an article start constituted by two special codes, followed by an article heading having, inter alia, three classification bytes C1, C2 and C3,
memory having a digital data input and a control input,
a microprocessor,
a numbering keyboard for choosing a three-byte code, said code being between 001 and 999,
wherein it also comprises an early article acquisition decision circuit inserted between the demultiplexing circuit and the memory, said circuit incorporating:
a shift register having a series input connected to the demultiplexing circuit, a series output connected to the data input of the memory, said register having three first cells containing respectively, said three classification bytes $C_1$, $C_2$ and $C_3$ and two other cells containing said two special codes connected to five parallel outputs, a storage module having a first group of three storage cells able to store three bytes, namely $A_1$, $A_2$ and $A_3$, a second group of three storage cells able to store three bytes, namely, $B_1$, $B_2$ and $B_3$ and a two-bit flip-flop, which can therefore be in any one of four logic states, a logic comparison circuit incorporating a first group of three byte comparators with two inputs, one input connected to a respective one of the first group of three storage cells and the other input connected to one of the parallel outputs of the three first cells of the shift register, said first group carrying out a first test involving bytes $C_1$, $C_2$ and $C_3$ and bytes $A_1$, $A_2$ and $A_3$, a second group of three byte comparators with two inputs, one input connected to the output of a respective one of the second group of three storage cells and the other to one of the parallel outputs of the three first cells of the shift register, said second group carrying out a second test involving bytes $C_1$, $C_2$ and $C_3$, and finally an article start code detector connected to the parallel outputs of the last two cells of the shift register, a comparison synthesis logic circuit connected to said first and second groups of comparators, to the start code detector and to the flip-flop, said circuit supplying an opening or closing control signal applied to the control input of the memory, as a function of the result of said tests, a state of the flip-flop defining a resetting of the storage cells, the microprocessor loading in an appropriate manner the storage cells with said bytes A1, A2 and A3 defining a page to be selected and with said bytes B1, B2 and B3 defining a threshold, such that all the articles whose classification bytes C1, C2 and C3 exceed this threshold, bring about the appearance of the memory opening signal, said microprocessor checking after each data transmission cycle the state of the memory in order to raise or lower the threshold, or leave it unchanged.

* * * * *